(12) United States Patent  (10) Patent No.: US 7,516,611 B2
Wassmur et al.  (45) Date of Patent: Apr. 14, 2009

(54) SECONDARY AIR INJECTION SYSTEM FOR AN INTERNAL COMBUSTION ENGINE

(75) Inventors: Robert Wassmur, Kungsbacka (SE); Magnus Blomroos, Västra Frölunda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/535,088

(22) Filed: Sep. 26, 2006

(65) Prior Publication Data
US 2007/0068145 A1 Mar. 29, 2007

(30) Foreign Application Priority Data
Sep. 27, 2005 (EP) ................... 05020981

(51) Int. Cl.
*F01N 3/00* (2006.01)
(52) U.S. Cl. ............... 60/289; 60/291; 60/293
(58) Field of Classification Search ........... 60/289, 60/291, 293
See application file for complete search history.

(56) References Cited

U.S. PATENT DOCUMENTS

| | | | | |
|---|---|---|---|---|
| 3,869,858 A | * | 3/1975 | Goto et al. ............... | 60/290 |
| 4,123,904 A | * | 11/1978 | Nonoyama et al. ......... | 60/290 |
| 4,189,915 A | * | 2/1980 | Miura ..................... | 60/290 |
| 5,381,658 A | * | 1/1995 | Meguro ................... | 60/276 |
| 5,444,978 A | * | 8/1995 | Yoshizaki et al. .......... | 60/276 |
| 5,471,835 A | * | 12/1995 | Friedman ................. | 60/293 |
| 5,832,725 A | * | 11/1998 | Sim ....................... | 60/289 |
| 6,167,699 B1 | * | 1/2001 | Johnston et al. ........... | 60/304 |
| 6,918,245 B2 | * | 7/2005 | Hirooka et al. ............ | 60/289 |
| 6,973,777 B2 | * | 12/2005 | Bayerle et al. ............. | 60/289 |
| 7,140,177 B2 | * | 11/2006 | Koyama et al. ............ | 60/289 |

FOREIGN PATENT DOCUMENTS

JP 06-272551 * 9/1994

* cited by examiner

*Primary Examiner*—Thomas E Denion
*Assistant Examiner*—Diem Tran
(74) *Attorney, Agent, or Firm*—Julia Voutyras; Alleman Hall McCoy Russell & Tuttle LLP

(57) ABSTRACT

The present invention relates to a secondary air injection system for an internal combustion engine, and an automotive vehicle comprising such a secondary air injection system. The arrangement includes shut-off valve for selectively passing on or restricting airflow form the secondary air injection system. A flexible connector is arranged to receive the airflow and pass it on to at least two reed-type non-return valves arranged to substantially only allow airflow in the downstream direction. At the downstream side of each respective reed-type non-return valve a conduit for communicating any airflow passed there through to an associated exhaust bank of the internal combustion engine.

10 Claims, 2 Drawing Sheets

SECONDARY AIR INJECTION SYSTEM FOR AN INTERNAL COMBUSTION ENGINE

FIELD OF INVENTION

The present invention relates to an arrangement in a secondary air injection system for an internal combustion engine. Moreover, the present invention also concerns a secondary air injection system comprising such an arrangement and an automotive vehicle comprising such a secondary air injection system.

BACKGROUND OF THE INVENTION

In the field of motor vehicles which are operated by means of internal combustion engines it is a general requirement that the concentration of certain regulated substances, such as unburnt residues of hydrocarbons (HC), oxides of nitrogen (NOx) and carbon monoxide (CO), in the engine's exhaust gas should be as low as possible. In today's motor vehicles equipped with gasoline engines, a purification of the exhaust gas is normally carried out by means of a catalytic converter, or catalyst, arranged in the exhaust system. In the contemporary so-called three-way catalyst, the major part of the above-mentioned substances is eliminated by means of various well-known catalytic reactions.

The catalysts commonly used today provide a very high degree of exhaust gas purification at the appropriate operating temperature of the catalyst. However, from cold start a certain time period of heating is required in order for the catalyst to reach the operating temperature at which an optimum degree of purification may be obtained. The so-called "light-off temperature" of the catalyst is approximately 200-350° C. and may be defined as the temperature at which the catalyst provides a 50% degree of purification of a certain regulated component in the exhaust gases. During the initial warm-up phase of the catalyst, which e.g. may be approximately 30-90 seconds, the catalyst cannot operate in an optimum manner as regards the elimination of the regulated substances in the exhaust gases.

In order to shorten the time required for the catalyst to reach the so-called "light-off temperature" is known to inject secondary air into the exhaust gas. This secondary air is mixed with the exhaust gas immediately downstream of the engine's exhaust valves, resulting in an oxidation of the mixture consisting of the exhaust gases and the secondary air. The oxidation process is mainly due to the hydrogen which is present in the exhaust gases. The oxidation reaction generates a high amount of heat energy which is guided through the exhaust pipe and fed to the catalyst, which subsequently becomes heated more rapidly.

A technical problem encountered with the secondary air injection systems described in the foregoing is that although the above-mentioned arrangement results in a reduced time taken until the so-called "light-off temperature" of the catalyst is reached, it suffers from the drawback that the performance of the engine is easily negatively affected. This is among other things due to the fact that so-called "breathing" between the cylinders of the internal combustion engine tends to occur, resulting in low end torque loss.

A previously known way of addressing this problem has been to separate the exhaust banks of cylinders likely to cause this problem and to inject secondary air into the exhaust gas of the respective exhaust banks separately. However, in order to reduce the cost and complexity of such a secondary air injection system usually a common secondary air injection pump is used, the air of which is then selectively fed into the respective exhaust banks using a respective complex and rather expensive shut-off valve. For packaging reasons the shut-off valves are usually arranged in the direct vicinity of the exhaust banks, for which reason the material used for the shut-off valves must be thermally safe, i.e. able to withstand the high temperatures associated with the exhaust banks. This tends to further increase the cost of the shut-off valves.

SUMMARY OF THE INVENTION

Accordingly, the present invention is directed to providing an improved arrangement in a secondary air injection system for an internal combustion engine, which is potentially less costly and complex to manufacture and has improved operating characteristics.

According to a first aspect of the present invention, there is provided secondary air injection system for an internal combustion engine, including: a secondary air injection pump; a first air conduit coupled to said secondary air injection pump; a valve for selectively passing on or restricting airflow, said valve coupled to said air conduit downstream of said secondary air injection pump; a flexible connector coupled to said valve for receiving in an internal volume said airflow passed on by said valve; at least two reed-type non-return valves arranged to substantially only allow an airflow in the downstream direction, said reed-type valves arranged at the downstream side of said flexible connector; and a second air conduit arranged at the downstream side of each respective said reed-type non-return valve for communicating any airflow passed through each respective reed-type non-return valve to an associated exhaust bank of said internal combustion engine.

The invention is of advantage in that inclusion of the reed-type non-return valves reduces the complexity and eliminates the need of more than one shut-off valve, which elimination and the fact that the reed-type non-return valves generally are less expensive reduces the overall cost of the secondary air injection system.

In one embodiment, separate exhaust banks are provided for each separate exhaust port of said internal combustion engine.

Providing separate exhaust banks for each separate exhaust port of said internal combustion engine will substantially reduce the occurrence of "breathing" between exhaust banks and/or individual exhaust ports, thus improving low end torque characteristics.

In an alternative embodiment, said flexible connector is arranged such that as said valve means is brought from passing on to restricting said airflow during operation of said internal combustion engine the internal volume of said flexible connector is arranged to decrease such that an under pressure is created at the upstream side of the reed-type non-return valves, as said flexible connector strives to regain its original internal volume, thus forcing said reed-type non-return valves to close and thereafter remain closed.

This is advantageous as reed-type non-return valves may otherwise have a tendency to "flutter", i.e. oscillate between closed and open position, which in addition to being unsatisfactory from a performance point of view contributes to decreasing the service life expectancy of the reed-type non-return valves, e.g. due to materials fatigue. Due to the under pressure the reed-type non-return valves will remain closed until the shut-off valve is opened next time.

In yet another alternative embodiment, said flexible interconnecting means is arranged to thermally separate said shut-off valve means from said reed-type non-return valves through using a material for said flexible interconnecting means which is a poor conductor of heat energy and adapting the spacing said flexible interconnecting means provides between said reed-type non-return valves and said shut-off valve means.

Arranging the flexible connector to thermally separate the valve from the reed-type non-return valves imparts to the secondary air injection system other desirable characteristics in addition to those mentioned above, in particular the connector will enable the thermal separation of the valve from the exhaust banks, enabling the valve to be assembled from less expensive materials possibly less able to withstand the high temperatures associated with the exhaust banks, which further reduces the overall cost of the secondary air injection system. Furthermore, from a packaging point of view, increased flexibility is provided for.

In yet another embodiment, said flexible connector is a hose.

Utilising as the flexible connector a hose, such as a rubber hose, will further contribute to maintaining a low overall cost of the secondary air injection system, while ensuring the positive properties mentioned above as well as ease of servicing and maintenance.

It will be appreciated that features of the invention are susceptible to being combined in any combination without departing from the scope of the invention as defined by the accompany claims.

BRIEF DESCRIPTION OF THE DRAWINGS

By way of example only, embodiments of the present invention will now be described with reference to the accompanying drawings wherein.

Figure 1:
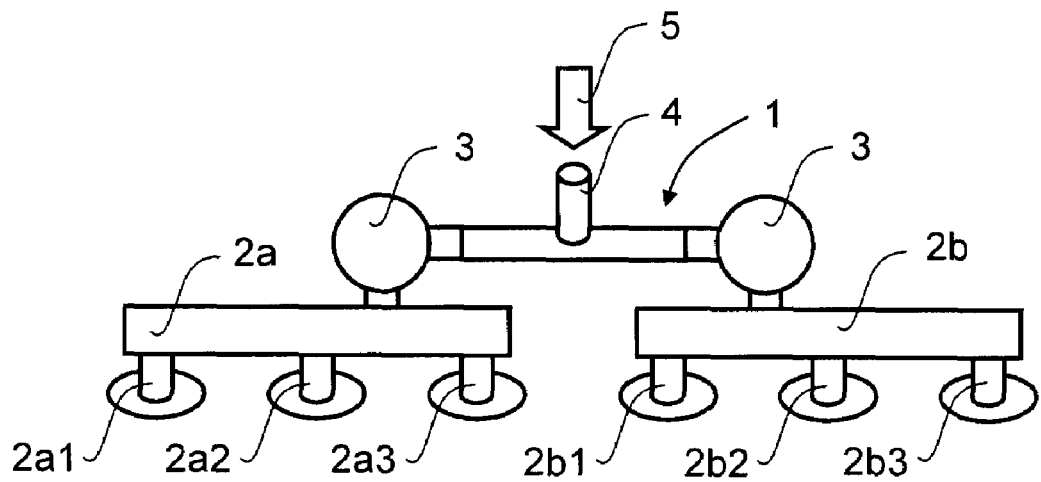
FIG. 1 is a schematic illustration of a prior art arrangement in a secondary air injection system for an internal combustion engine.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DETAILED DESCRIPTION OF PREFERRED EMBODIMENT(S)

Referring to FIG. 1, there is illustrated schematically a previously known way of addressing the problem of so-called "breathing" between the cylinders of an internal combustion engine in a secondary air injection system generally designated 1. The proposed solution has been to separate the exhaust banks 2a, 2b of the cylinders (not shown) that are likely to cause this problem and to inject secondary air into the exhaust gas of the respective exhaust banks 2a, 2b separately. In FIG. 1 this is illustrated for a six cylinder engine being provided with two exhaust banks 2a and 2b, serving e.g. cylinders 1-3 and 4-6 through connecting pipes 2a1, 2a2, 2a3 and 2b1, 2b2, 2b3 respectively.

However, in order to reduce the cost and complexity of such a secondary air injection system 1 usually a common secondary air injection pump (not shown) is used, the air of which, illustrated by arrow 5, is then selectively fed via tubing 4 into the respective exhaust banks 2a, 2b using a respective complex and rather expensive shut-off valve 3. For packaging reasons the shut-off valves 3 are usually arranged in the direct vicinity of the exhaust banks 2a, 2b. Accordingly, the material used for the shut-off valves 3 must be thermally safe, i.e. able to withstand the high temperatures associated with the exhaust banks 2. This tends to further increase the cost of the shut-off valves 3.

The secondary air injection system is to be arranged in connection with an internal combustion engine (not shown). The engine is intended to be arranged to be supplied with an air/fuel mixture via an intake manifold (not shown). Furthermore, the engine exhaust (not shown) is intended to be connected to a catalytic converter (not shown) which preferably is in the form of a conventional three-way catalyst which is adapted to reduce the harmful substances carbon monoxide (CO), hydrocarbon (HC) and oxides of nitrogen (NOx) which are present in the exhaust gas. The exhaust gas is discharged from the engine via an exhaust pipe (not shown). As the person skilled in the art should be thoroughly familiar with the above engine arrangement, further detail is not presented here.

Figure 2:
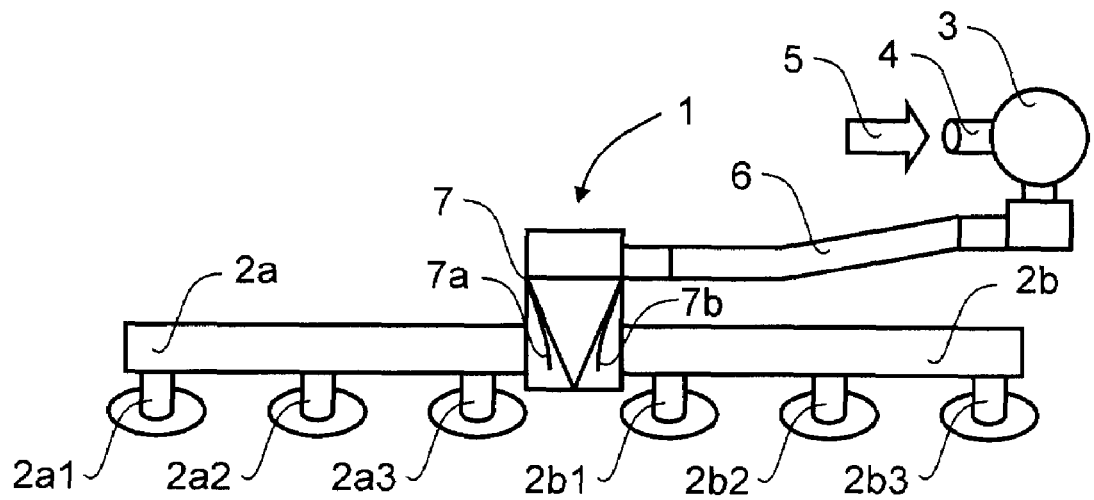
FIG. 2 is a schematic illustration of an arrangement in a secondary air injection system for an internal combustion engine according to the present invention.

Referring now to FIG. 2, there is illustrated schematically the part of a secondary air injection system in which the arrangement according to the present invention is incorporated. The arrangement comprises a conduit 4, such as a tube, for receiving airflow, illustrated by arrow 5, from a secondary air injection pump (not shown). Arranged at the downstream side of the airflow receiving conduit 4 a shut-off valve 3 is arranged for selectively passing on or restricting the airflow, e.g. under the control of an engine control unit (not shown) in a manner well known to the person skilled in the art.

In addition, arranged at the downstream side of the shut-off valve 3 a flexible connector 6 is arranged for receiving the airflow 5 passed on by the shut off-valve 3 and transporting it to at least two reed-type non-return valves 7a, 7b arranged at the downstream side of the flexible connector 6. Here this is once again illustrated for a six cylinder engine being provided with two exhaust banks 2a and 2b, serving e.g. cylinders 1-3 and 4-6 through connecting pipes 2a1, 2a2, 2a3 and 2b1, 2b2, 2b3 respectively. However, other configurations are possible where more than two exhaust banks are used, e.g. a separate exhaust bank may be used for each separate exhaust port of the engine. The number of reed-type non-return valves required for such configurations will correspond to the number of exhaust banks used.

The reed-type non-return valves 7a, 7b are arranged to only substantially allow an airflow in the downstream direction, i.e. from the shut-off valve 3 and towards the exhaust banks 2a, 2b. With "substantially", as used above, is meant that an airflow is intended to only occur in the downstream direction, however, as will be well known to the person skilled in the art, an insignificant amount leakage in the opposite direction may be acceptable as long as the overall performance of the arrangement is not significantly affected. At the downstream side of each respective reed-type non-return valve 7a, 7b there is arranged a respective conduit for communicating any airflow passed through the respective reed-type non-return valve 7a, 7b on to an associated exhaust bank 2a, 2b of the internal combustion engine.

The flexible connector 6 is arranged such that as the shut-off valve 3 is brought from passing on to restricting the airflow 5, during operation of the internal combustion engine, the internal volume of the flexible connector 6 is arranged to decrease such that an under pressure is created at the upstream side of the reed-type non-return valves 7a, 7b, as the flexible connector 6 strives to regain its original internal volume. Accordingly, the reed-type non-return valves 7a, 7b are forced to close and thereafter to remain closed as long as the under pressure is retained.

Furthermore, the flexible connector 6 is suitably arranged to thermally separate the shut-off valve 3 from the reed-type non-return valves 7a, 7b. This is enabled through using a material for the flexible connector 6 which is a poor conductor of heat energy and adapting the separation distance provided by the flexible connector 6, i.e. the spacing the flexible connector 6 provides between the reed-type non-return valves 7a, 7b and the shut-off valve means 3. Suitable materials include the rubber type materials commonly used for hoses and tubing in engine compartments of automotive vehicles. Furthermore, from a packaging point of view, the flexible connector 6 enables an arbitrary placement of the shut-off valve 3, e.g. in a position which is thermally separated from the exhaust banks or other high temperature vehicle components.

The length and internal diameter, i.e. the difference between the maximum and minimum internal volume of the flexible connector 6, needs to be adapted such that a sufficient under pressure, for the purpose described above, is created as the shut-off valve 3 closes, as described above. As an alternative, if sufficient difference between the maximum and minimum internal volume of the flexible connector 6 per se cannot be achieved, e.g. for packaging reasons, a separate compressible volume may be arranged in parallel with the flexible connector 6 in order to provide sufficient difference.

Figure 3:
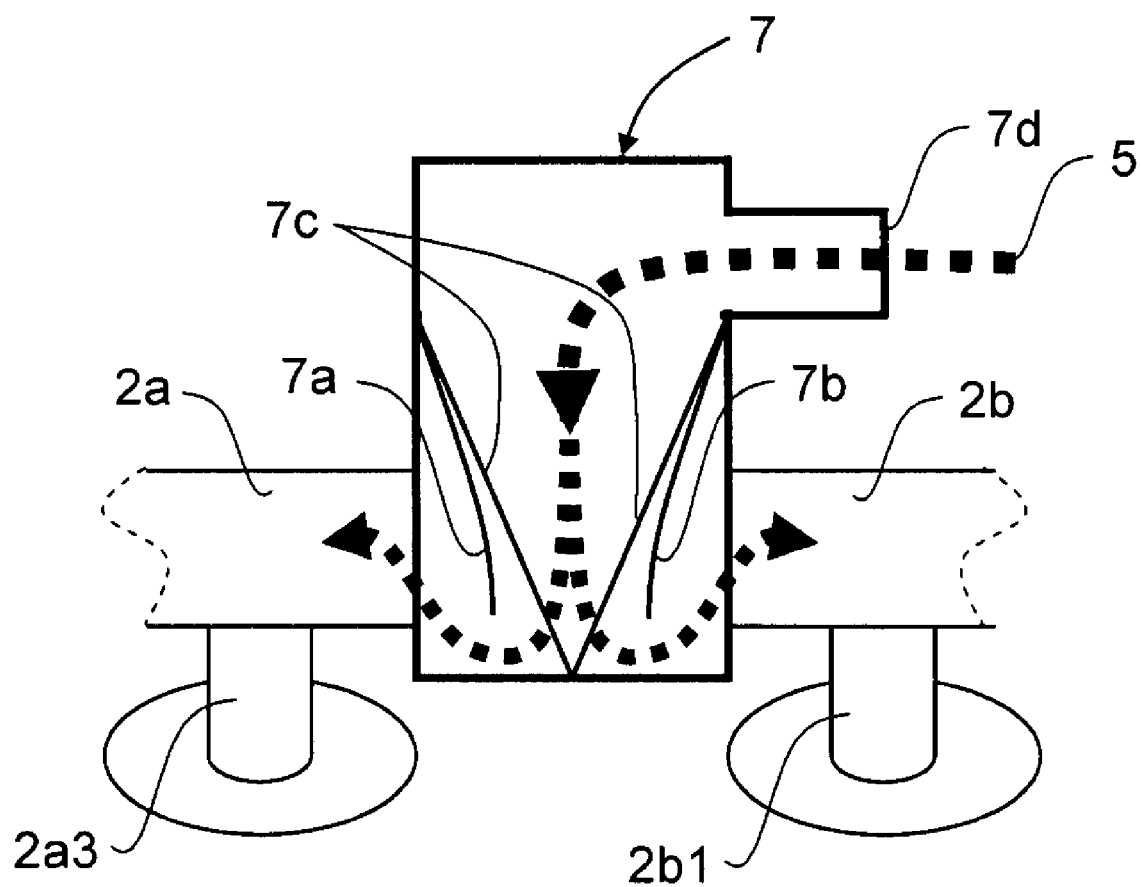
FIG. 3 is a schematic detail of a reed-type non-return valve configuration in the arrangement of the present invention.

Referring now to FIG. 3, the reed-type non-return valve configuration in the arrangement of FIG. 2 is illustrated in more detail. The reed-type non-return valves 7a, 7b are arranged in a valve housing 7, which receives the airflow 5, illustrated by the dotted arrow, selectively passed on by the shut off-valve means 3 via an inlet 7d. The airflow 5 moves into the valve housing 7 where it encounters a partition wall 7c. The partition wall 7c is provided with through openings (not shown) which are in turn covered at the downstream side by flexible valve flaps 7a and 7b respectively, i.e. in a conventional reed-type non-return valve arrangement.

Once the pressure upstream of the valve flaps 7a, 7b exceeds the pressure downstream of the valve flaps 7a, 7b by a predetermined amount the valve flaps 7a, 7b will expose the through openings of the partition wall 7c and allow the airflow 5 to pass on towards the exhaust banks 2a, 2b, which are shown only partially in FIG. 3. In a corresponding manner, of course, once the pressure upstream of the valve flaps 7a, 7b is below the predetermined amount the reed-type non-return valves 7a, 7b will close. Downstream of the valve flaps 7a, 7b, the valve housing 7 connects to the respective exhaust banks 2a, 2b.

When the engine is not operated the valve flaps 7a, 7b may be provided with a small default offset, such that any water present in the valve housing 7 may be drained through the thus exposed sections of the through openings of the partition wall 7c. This is useful as the opening movement of the valve flaps 7a, 7b of the reed-type non-return valves 7a, 7b may otherwise become impaired if the water freezes as the unused vehicle is exposed to sub zero ° C. temperatures. When the engine is operated the offset will be eliminated as the valve flaps 7a, 7b will be closed by means of the under pressure as described above.

The above described arrangement in a secondary air injection system in accordance with the present invention is useful on all internal combustion engines or so-called "Otto" engines with secondary air injection and more than one cylinder and will prevent low end torque loss whilst using secondary air injection through preventing "breathing" between exhaust banks and/or individual exhaust ports. The arrangement enables a reliable secondary air injection system to be designed whilst keeping the cost as low as possible. Furthermore, the arrangement enables the initial warm-up phase of the catalyst, i.e. the time until the so-called "light-off temperature" of the catalyst is reached, to become less than 10 seconds.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A secondary air injection system for an internal combustion engine, comprising:
   a secondary air injection pump;
   a first air conduit coupled to said secondary air injection pump;
   a valve for selectively passing on or restricting airflow, said valve coupled to said air conduit downstream of said secondary air injection pump;
   a flexible connector directly coupled to said valve for receiving in an internal volume said airflow passed on by said valve;
   at least two reed-type non-return valves arranged to substantially only allow an airflow in the downstream direction, said reed-type valves arranged at the downstream side of said flexible connector, where said flexible connector further transports said airflow passed on by said valve to each of said reed-type non-return valves; and
   a second air conduit arranged at the downstream side of each respective said reed-type non-return valve for communicating any airflow passed through each respective reed-type non-return valve to an associated exhaust bank of said internal combustion engine, where each exhaust bank receives exhaust gases from a plurality of cylinders, and where said airflow passed through each respective reed-type non-return valve is communicated to downstream of the plurality of cylinders;

wherein said flexible connector is arranged such that as said shut-off valve is brought from passing on to restricting said airflow during operation of said internal combustion engine said internal volume of said flexible connector is arranged to decrease such that an under pressure is created at the upstream side of said reed-type non-return valves, as said flexible connector strives to regain its original internal volumes thus forcing said reed-type non-return valves to close and thereafter remain closed.

2. The system according to claim 1 wherein said flexible connector is arranged to thermally separate said valve from said reed-type non-return valves through using a material for said flexible connector which is a poor conductor of heat energy and adapting the spacing said flexible connector provides between said reed-type non-return valves and said valve.

3. The system according to claim 1 wherein said flexible connector is a hose.

4. A secondary air injection system for an internal combustion engine, comprising:
- a first exhaust bank communicating with a first group of a first plurality of cylinders;
- a second exhaust bank communicating with a second group of a second plurality of cylinders;
- a secondary air injection pump;
- a first air conduit coupled to said secondary air injection pump;
- a valve for selectively passing on or restricting airflow, said valve coupled to said first air conduit downstream of said secondary air injection pump;
- a flexible connector coupled to said valve for receiving in an internal volume said airflow passed on by said valve;
- a first reed-type non-return valve arranged to substantially only allow a first airflow in the downstream direction, said first reed-type valve arranged at a downstream side of said flexible connector;
- a second reed-type non-return valve arranged to substantially only allow a second airflow in the downstream direction, said second reed-type valve arranged at the downstream side of said flexible connector, where any airflow passed through the first reed-type non-return valve is communicated to the first exhaust bank at a first location downstream of the first plurality of cylinders and where any airflow passed through the second reed-type non-return valve is communicated to the second exhaust bank downstream of the second plurality of cylinders; and wherein said flexible connector is arranged such that as said shut-off valve is brought from passing on to restricting said airflow during operation of said internal combustion engine said internal volume of said flexible connector is arranged to decrease such that an under pressure is created at the upstream side of said reed-type non-return valves, as said flexible connector strives to regain its original internal volume, thus forcing said reed-type non-return valves to close and thereafter remain closed.

5. The secondary air injection system of claim 4, wherein said flexible connector further transports said airflow passed on by said valve to both said first and said second reed-type non-return valves.

6. The secondary air injection system of claim 4 wherein the first and second reed type valves are coupled spatially opposite one another.

7. The secondary air injection system Claim 4, wherein the first and second reed type valves are coupled together in a common valve housing.

8. The system of claim 4 where the first and second reed type valves are coupled spatially opposite one another.

9. The system according to claim 8 wherein said flexible connector is arranged to thermally separate said valve from said reed-type non-return valves through using a material for said flexible connector which is a poor conductor of heat energy and adapting the spacing said flexible connector provides between said reed-type non-return valves and said valve.

10. The system according to claim 9 wherein said flexible connector is a hose.

* * * * *